D. T. SHARPLES.
LINER FOR CENTRIFUGAL SEPARATORS.
APPLICATION FILED FEB. 23, 1907.
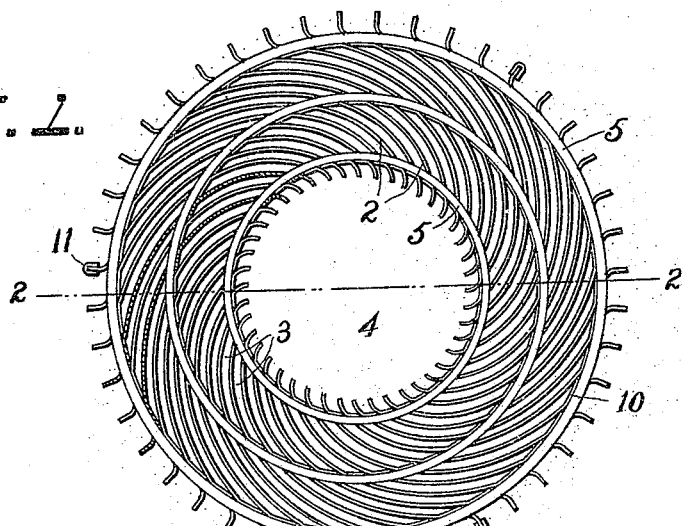
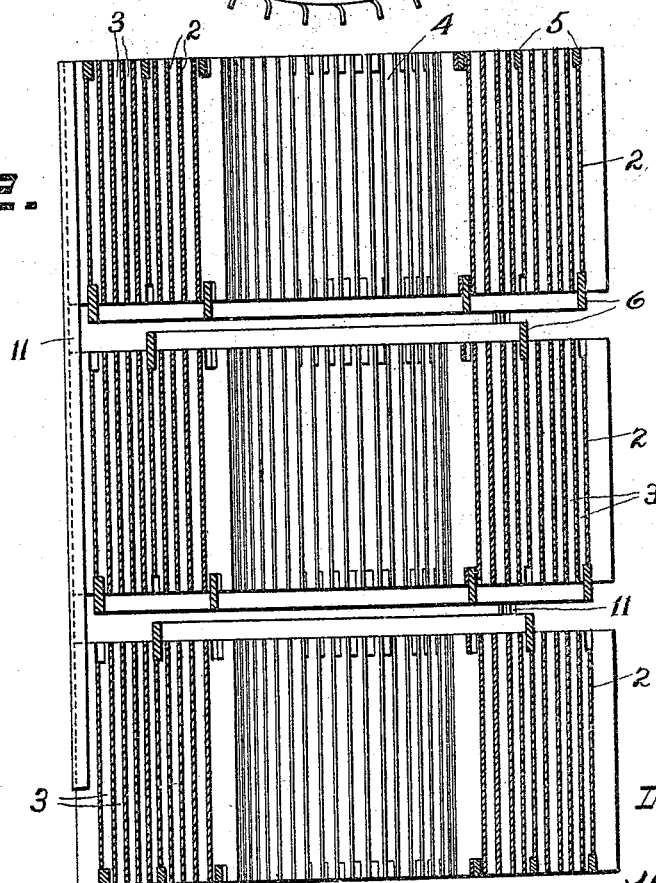

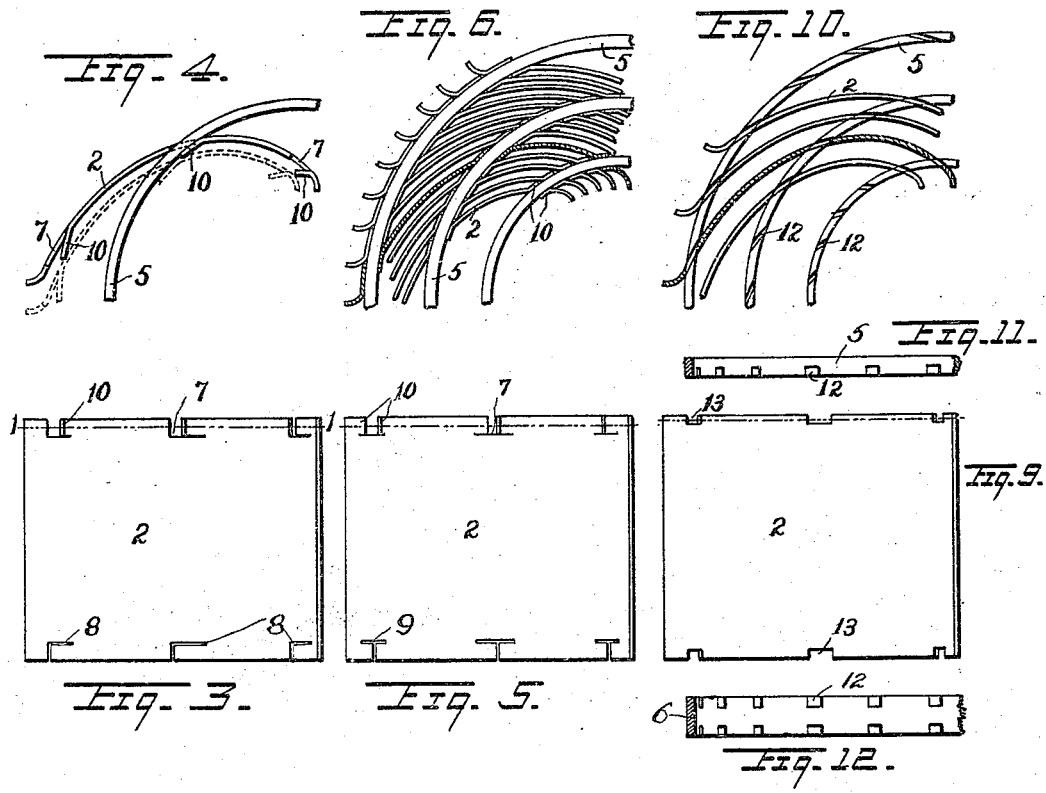

UNITED STATES PATENT OFFICE.

DAVID TOWNSEND SHARPLES, OF WEST CHESTER, PENNSYLVANIA.

LINER FOR CENTRIFUGAL SEPARATORS.

949,848.      Specification of Letters Patent.      Patented Feb. 22, 1910.

Application filed February 23, 1907. Serial No. 353,812.

*To all whom it may concern:*

Be it known that I, DAVID TOWNSEND SHARPLES, a citizen of the United States, and a resident of West Chester, in the county of Chester and State of Pennsylvania, have invented certain new and useful Improvements in Liners for Centrifugal Separators, of which the following is a specification.

My invention relates particularly to that class of division devices or liners for centrifugal liquid separators shown in my prior patent No. 787,950, issued April 25th, 1905, in which the division plates are rigidly connected so as to form a fixed structure.

The present invention consists in providing an improved rigidly constructed division device, as fully described in connection with the accompanying drawing, the novel features being specifically pointed out in the claims.

Figure 1 is a plan view of a division device or liner embodying my invention, certain of the plates being shown in section on the line 1—1 of Fig. 3. Fig. 2 is a sectional elevation of the same on the line 2—2 of Fig. 1, showing several separately formed sections ready to be united in a superposed series of desired height. Figs. 3 and 4 are separate views of one of the plates showing the preferred form of notches for engaging the rings. Figs. 5 and 6 show a modified plate arrangement with double-winged notches. Figs. 7 and 8 show the different width rings employed. Fig. 9 shows a modification in which both the rings and plates are notched; Figs. 10, 11 and 12 being corresponding detail views.

The division plates 2, 2, 2, as indicated, are of curved form as shown in my prior patent referred to. Arranged approximately parallel to each other across the radial lines of the device, they are spaced apart to form liquid spaces 3 between them, all of which communicate interiorly with the axial opening 4.

In my improved construction the circular series of plates 2 which form a division device,—or a complete section of one as the case may be,—is united by means of connecting rings or annuli of different diameters, each of which is arranged as shown to engage all the plates so as to hold them in fixed relation to each other. This engagement is effected as shown by providing in the plates 2, at each end thereof, separate series of edge-wise notches or ways 7 to receive the different sized rings 5 5 for the top edges or 6 6 for the abutting edges. These notches are formed preferably by merely slitting the plates as indicated at 8 and 9 (Figs. 3 and 5) and bending the wings 10 thus formed, parallel with the ring, so that they serve to space apart the plates as desired. A series of plates and rings thus notched together to form a single structure, is preferably dipped into tin to give it rigidity and permanence.

To provide for connecting any number of superposed sections that may be required for a long separator bowl or vessel, into practically one division device, certain of the interposed connecting rings (6) may be made of double width to engage the abutted plates of superposed sections, as indicated in Fig. 2; grooved alining strips 11 being also provided as shown, in engagement with the longitudinal edges of the abutting division plates, to insure proper connection of the sections into a single division device when in service. Said longitudinal strips are made removable when it is desired to separate the several sections for convenience of cleaning, as hereafter described; or the connected sections may be permanently combined if preferred by dipping the built-up structure into tin.

The slightly modified construction indicated in Figs. 5 and 6 provides for a closer spacing of the division plates, each notch being provided with two reversely bent wings 10, 10, instead of one as in Figs. 3 and 4 to engage the inserted ring on its opposite sides. In the modified construction of Figs 9 to 12, these spacing projections or wings on the plates are dispensed with, and the rings are provided with spacing notches 12, corresponding in number with the plates and coöperating with the notches 13 in the latter to fix the relation of the assembled parts; the whole being preferably dipped into tin to rigidly unite the assembled parts. The notches 12 in the rings 5 and 6 are cut obliquely as shown in Fig 10, and the notches 13 in the plates are correspondingly reduced in depth so that when engaged, the top rings 5 5 will be flush with the top edges of the plates, while the interposed rings 6 6 will permit the edges of abutting sections to come together.

What I claim is:—

1. A liner for centrifugal liquid separators comprising a series of spaced division plates extending across the radial lines of the liner and having adjacent end-edges thereof provided with separate circular series of notches at different distances from the axis of the liner, and connecting rings of correspondingly different diameters engaged in the respective series of notches.

2. A liner for centrifugal liquid separators comprising a series of spaced division plates extending across the radial lines of the liner and notched connecting rings therefor each of which engages notches in the several plates to hold the latter in fixed relation to each other.

3. A liner for centrifugal liquid separators comprising a series of spaced division plates extending across the radial lines of the liner and connecting rings therefor, said plates being formed with notches in which said rings are engaged and with lateral projections at said notches to space apart the plates.

4. A liner for centrifugal liquid separators comprising a series of spaced division plates extending across the radial lines of the liner and connecting rings therefor, said plates having laterally bent portions forming spacing wings and notches for engaging the rings.

5. A liner for centrifugal liquid separators comprising a series of spaced division plates extending across the radial lines of the liner and connecting rings therefor each of said plates having an edge thereof provided with spaced notches and said rings being of different diameters and engaged respectively in a series of said notches substantially as set forth.

6. A liner for centrifugal liquid separators comprising a series of spaced division plates extending across the radial lines of the liner and connecting rings therefor each of said plates being provided with spaced notches in its top and bottom edges and each of said rings being engaged in a series of said notches.

7. A liner for centrifugal liquid separators made up of similar superposed sections each of which comprises a connected series of spaced vertical plates, said sections being connected by an interposed ring having a notched engagement with the abutting plates of both sections.

8. A liner for centrifugal liquid separators made up of separately formed superposed sections each of which comprises a series of division plates extending across the radial lines of the liner and connecting rings therefor engaging the several plates thereof to hold the same in fixed relation to each other, one of said connecting rings being arranged to engage the plates of two abutted sections.

9. A liner for centrifugal liquid separators made up of separately formed superposed sections each comprising a series of rigidly connected spaced division plates extending across the radial lines of the liner, and alining strips engaging the longitudinal edges of abutted plates of the superposed sections substantially as set forth.

10. A liner for centrifugal liquid separators made up of separately formed superposed sections each of which comprises a series of division plates extending across the radial lines of the liner and connecting rings therefor engaging the several plates thereof to hold the same in fixed relation to each other, one of said connecting rings being arranged to engage the plates of two abutted sections and alining strips engaging the longitudinal edges of abutted plates of the superposed sections substantially as set forth.

In testimony whereof, I affix my signature, in the presence of two witnesses.

DAVID TOWNSEND SHARPLES.

Witnesses:
 MARY B. DARLINGTON,
 ISABEL DARLINGTON.